United States Patent [19]

Merrithew

[11] Patent Number: 5,792,033
[45] Date of Patent: Aug. 11, 1998

[54] REFORMER APPARATUS

[76] Inventor: Lindsay Merrithew, 456 Danforth Avenue, Toronto, Ontario, Canada, M4K 1P4

[21] Appl. No.: 764,354

[22] Filed: Dec. 12, 1996

[51] Int. Cl.[6] .......................... A63B 21/068; F16C 19/00
[52] U.S. Cl. ........................ 482/96; 384/58; 384/57; 384/19
[58] Field of Search ........................ 482/94, 95, 96; 312/333, 39, 334.33, 334.26, 334.25, 334.9, 334.12, 334.15, 334.18, 334.21; 384/19, 58, 57

[56] References Cited

U.S. PATENT DOCUMENTS

| | | | |
|---|---|---|---|
| 339,638 | 4/1886 | Goldie | 482/96 |
| 1,621,477 | 3/1927 | Pilates | |
| 2,912,288 | 11/1959 | Griswold | 384/58 X |
| 3,874,748 | 4/1975 | Figueroa | 384/19 |
| 4,101,124 | 7/1978 | Mahnke | 482/96 |
| 4,706,953 | 11/1987 | Graham | 482/96 |
| 4,863,288 | 9/1989 | Houck | 312/341 R X |
| 4,884,802 | 12/1989 | Graham | 482/96 X |
| 4,979,262 | 12/1990 | Lautenschlager | 384/57 X |
| 5,000,583 | 3/1991 | Shen | 384/19 |
| 5,042,797 | 8/1991 | Graham | 482/96 |
| 5,066,005 | 11/1991 | Luecke | 482/96 |
| 5,607,381 | 3/1997 | Endelman | |

FOREIGN PATENT DOCUMENTS 2194455  8/1987  United Kingdom .................. 482/96

*Primary Examiner*—Richard J. Apley
*Assistant Examiner*—William LaMarca
*Attorney, Agent, or Firm*—Nixon & Vanderhye P.C.

[57] ABSTRACT

This invention relates to an improved reformer apparatus comprising a pair of parallel rails supported by a supporting structure, a carriage mounted between and over the rails and biased towards the top end of the reformer apparatus, cords attached to the carriage and brought through pulleys and connected to straps which are returned back towards the carriage to permit a user to pull the carriage along the rails against the bias, adjustable posts to support and adjust the height of the pulleys, a longitudinal C-shaped opening formed in the rails which are derived from an extrusion having upper and lower flanges and a web, a rectangular supporting structure for the carriage including depending lugs, wheels to run within the C-shaped openings mounted on axles set in the lugs, and bushings set within the lugs of one side of the carriage for slidably receiving the axles of one set of wheels which run along the respective C-shaped opening of one of the parallel rails so that as the carriage is pulled along the rails against the biasing force by a user the axles of one set of wheels are free to slide in the respective bushings to permit the wheels to adjust within the rails. The provision of sliding axles within bushings permits the wheels to adjust within the rails to the various twisting and turning moments without seizing as they roll back and forth.

3 Claims, 4 Drawing Sheets

5,792,033

REFORMER APPARATUS

FIELD OF THE INVENTION

This application relates to a gymnastic apparatus known as a reformer.

BACKGROUND OF THE INVENTION

The reformer type of gymnastic apparatus was first invented by Joe Pilates and was patented in 1927 in U.S. Pat. No. 1,621,477. Pilates taught a gymnastic apparatus comprising a horizontal carriage mounted to move in a linear direction and having a sufficient length to permit a user to lie in a recumbent position with their back and shoulders on the carriage and having an abutment positioned at one end of the upper surface of the carriage to allow the user to rest their shoulders against the abutment, and also having a resistance means arranged between the carriage and a fixed point to oppose any movement of the carriage.

It is an object of this invention to provide an improved reformer apparatus.

SUMMARY OF THE INVENTION

This invention relates to an, improved reformer apparatus comprising a pair of parallel rails supported by a supporting structure, a carriage mounted between and over the rails and biased towards the top end of the reformer apparatus, cords attached to the carriage and brought through pulleys and connected to straps which are returned back towards the carriage to permit a user to pull the carriage along the rails against the bias, adjustable posts to support and adjust the height of the pulleys, a longitudinal C-shaped opening formed in the rails which are derived from an extrusion having upper and lower flanges and a web, a rectangular supporting structure for the carriage including depending lugs, wheels to run within the C-shaped openings mounted on axles set in the lugs, and bushings set within the lugs of one side of the carriage for slidably receiving the axles of one set of wheels which run along the respective C-shaped opening of one of the parallel rails so that as the carriage is pulled along the rails against the biasing force by a user the axles of one set of wheels are free to slide in the respective bushings to permit the wheels to adjust within the rails. The provision of sliding axles within bushings permits the wheels to adjust within the rails to the various twisting and turning moments without seizing as they roll back and forth.

Moreover, in the reformer apparatus of this invention the carriage includes a foam pad, shoulder supports, and a headboard to support a recumbent user.

Further, the reformer of this invention has the cords attached to the carriage beneath the headboard.

DESCRIPTION OF THE FIGURES

In the figures which illustrate a preferred embodiment of this invention.

DESCRIPTION OF THE INVENTION

Figure 1:
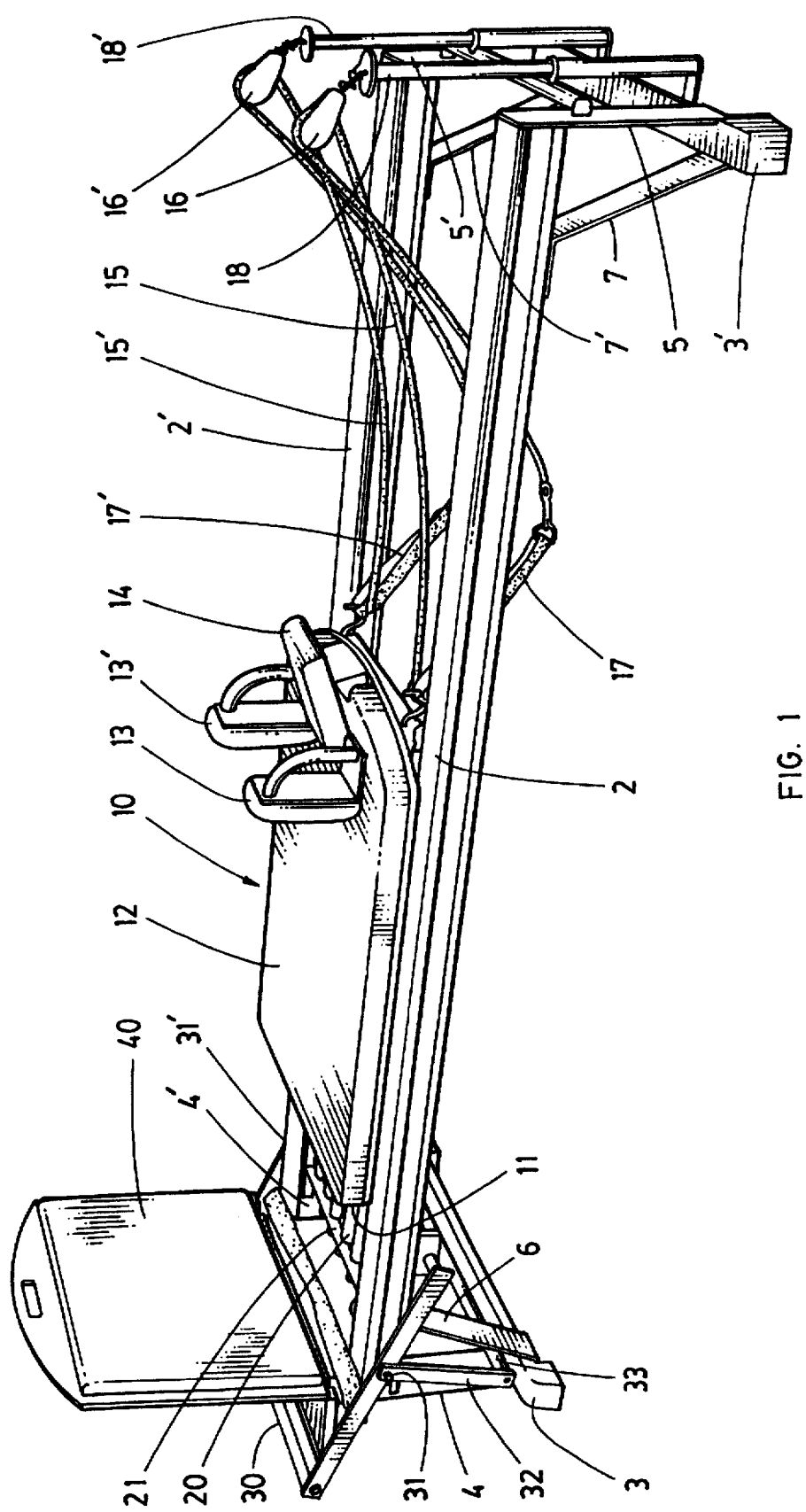
FIG. 1 is a perspective view of the reformer apparatus.

As illustrated in FIG. 1, the preferred embodiment of this invention comprises a pair of parallel rails 2 and 2' which are suspended above two pedestals 3 and 3' by means of legs 4 and 4' which connect the pedestal 3 to the rails 2 and 2' at the top end of the apparatus, and legs 5 and 5' which connect the other end of the rails 2 and 2' to the pedestal 3'. Supporting angle irons 6 and 6' (not illustrated) are provided at the top end to provide additional support between the pedestal 3 and the rails 2 and 2'. Similarly angle irons 7 and 7' are provided at the other end of the apparatus between the pedestal 3' and the rails 2 and 2' to provide additional support. A carriage 10 is mounted between and over the rails 2 and 2'. The carriage 10 is biased towards the top end by springs 20 connecting between a flange plate 21 between the rails 2 and 2' and the back end 11 of the carriage 10. The top of the carriage 10 is covered with a foam pad 12. Shoulder supports 13 and 13' and headboard 14 are also provided to support a recumbent user. Cords 15 and 15' are attached to the carriage 10 beneath the headboard 14 and brought through pulleys 16 and 16' and connected to straps 17 and 17' which are returned back towards the carriage 10 to permit a user to pull the carriage 10 along the rails 2 and 2' against the biasing force of the springs 20. The pulleys 16 and 16' are supported on adjustable posts 18 and 18' which telescope within themselves to adjust the height of the pulleys 16 and 16'. The posts 18 and 18' are affixed to the pedestal 3'. At the top end of the reformer apparatus is a tiltable support means 30 which is hinged at hinge pins 31 and 31' to supporting arms 32 and 32' hinged in rod 33 supported on the pedestal 3. The support means 30 may thus be pivoted to adjust its position relative to the rails 2 and 2' for different exercises. A second optional support means 40 may be attached to support means 30 to aid the user during different exercises.

Figure 2:
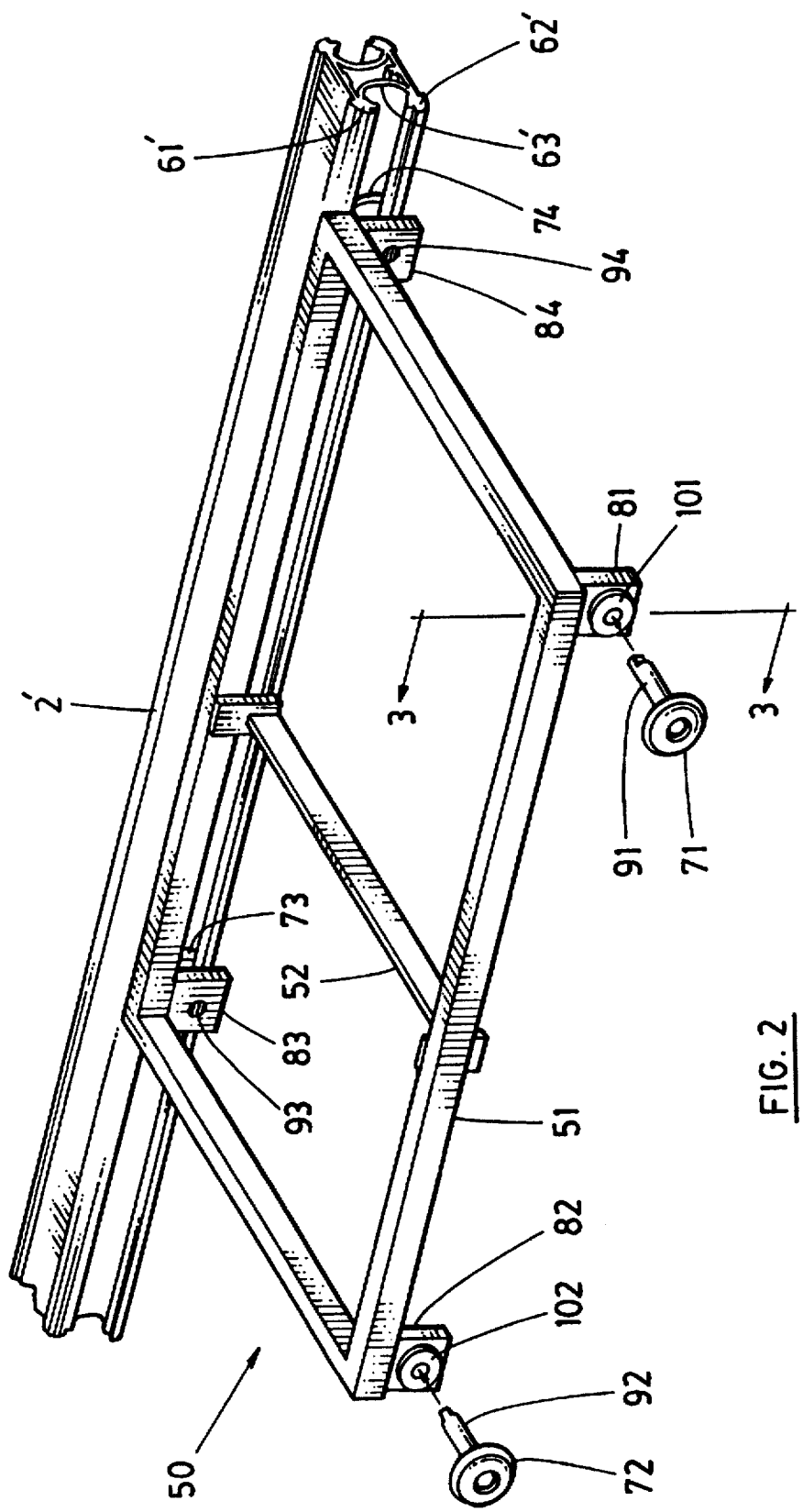
FIG. 2 is a perspective view of the carriage substructure.

FIG. 2 illustrates the supporting structure 50 of the carriage 10 and the rail 2'. The supporting structure 50 comprises a simple metal rectangle 51 with a spacer bar 52 to help retain the shape of the rectangle 51. The rail 2' comprises an aluminum extrusion having upper and lower flanges 61' and 62', respectively, and a web 63' which together form a longitudinally extending C-shaped opening. Four wheels 71, 72, 73, and 74, are mounted in depending lugs 81, 82, 83, and 84, respectively. Each pair of wheels on either side of the structure 50, for example, wheels 73 and 74, are mounted in the C-shaped opening of the upper and lower flanges and web 61', 62', and 63', respectively, of the rail, in this example is 2'. Similarly wheels 71 and 72 are mounted in a C-shaped opening in rail 2 (not illustrated in FIG. 2).

Wheels 73 and 74 are each mounted on an axles 93 and 94, respectively, set in the lugs 83 and 84, respectively. The wheels 73 and 74 are mounted for rotation on the axles 93 and 94, respectively, as is well known in the art.

Wheels 71 and 72 are mounted on axles 91 and 92, respectively; however, each of these axles is adapted to fit within bushings 101 and 102, respectively, which are set in lugs 81 and 82, respectively. The axles 91 and 92 are free to slide within the bushings 101 and 102, respectively, as will hereinafter be described.

Figure 3:
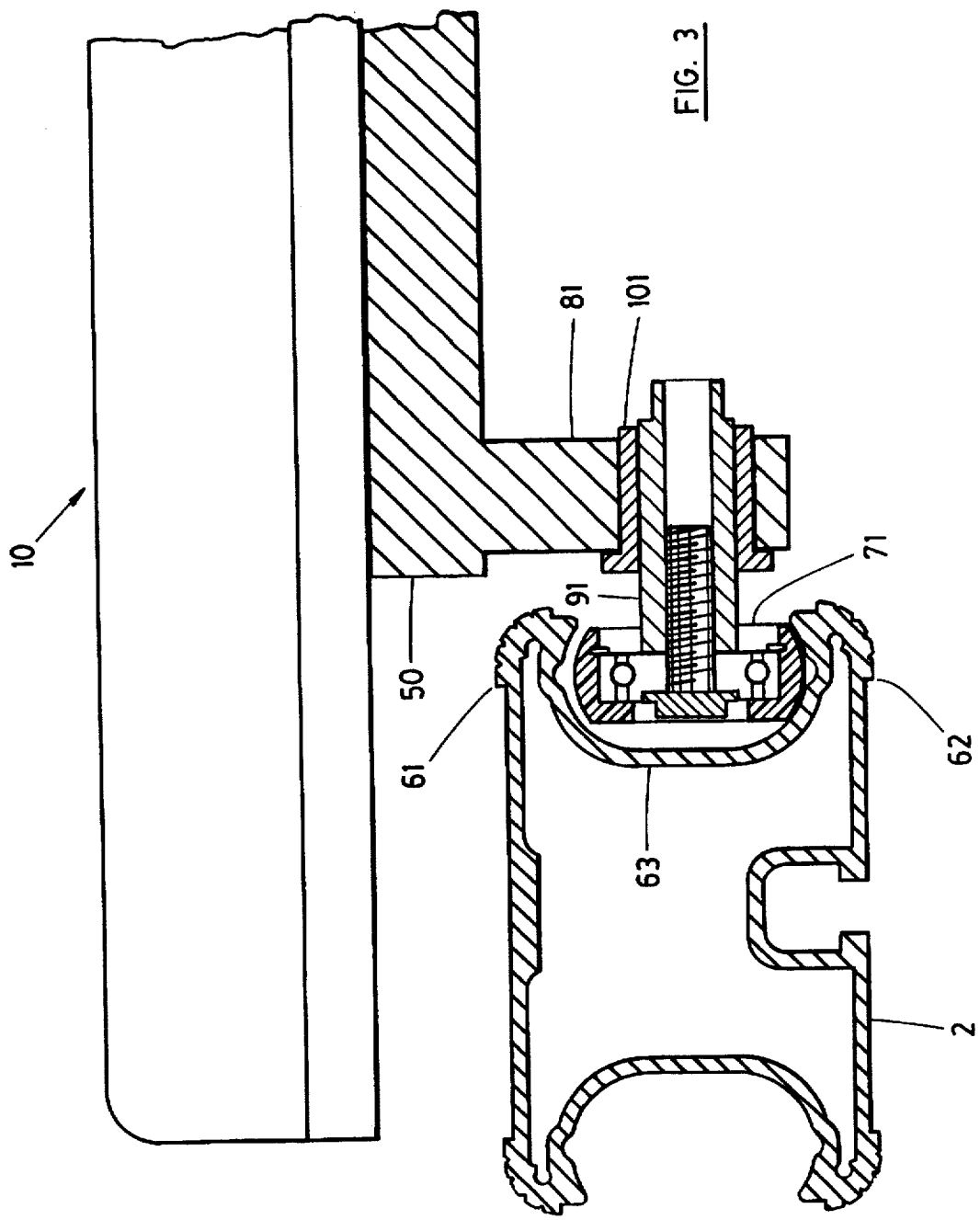
FIG. 3 is a sectional view of the wheel and rail assembly.

As illustrated in the more detailed section of FIG. 3, rail 2 comprises an upper flange 61 and a lower flange 62 and a web 63 formed in a C-shape to receive a wheel (71 in FIG. 3). FIG. 3 illustrates lug 81 depending from supporting structure 50 of carriage 10. Depending lug 81 has a brass bushing 101 adapted to receive the axle 91 of the wheel 71 in sliding connection. Thus the wheel 71 is free to rotate about the axle 91, and the axle 91 is free to slide in and out of the bushing 101. The C-shaped portion formed by the upper flange 61, the web 63, and the lower flange 62 has a side opening which is too small to permit the wheel 71 to slide out of the C-shaped section laterally. The C-shaped section is also higher than the height of the wheel 71 to permit the wheel 71 to turn.

Figure 4:
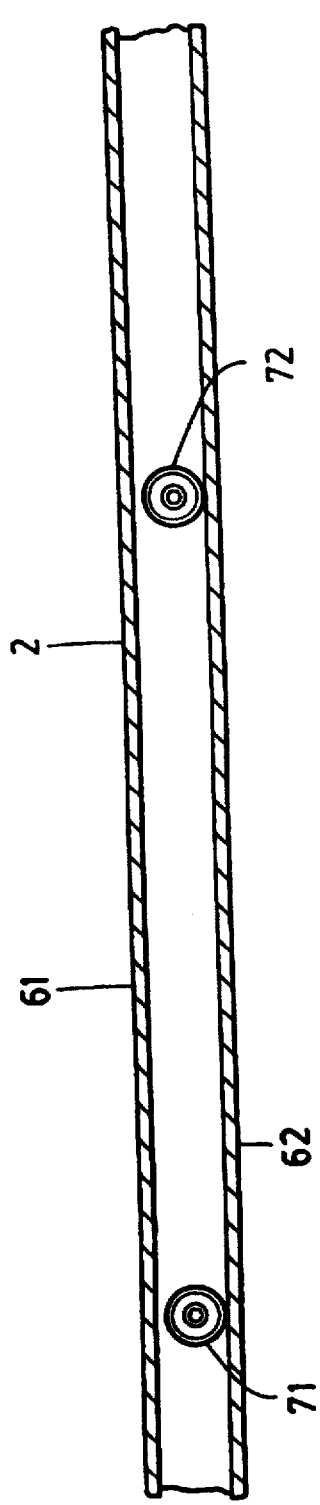
FIG. 4 is a side view of a pair of wheels riding on the lower flange of the rail.
Figure 5:
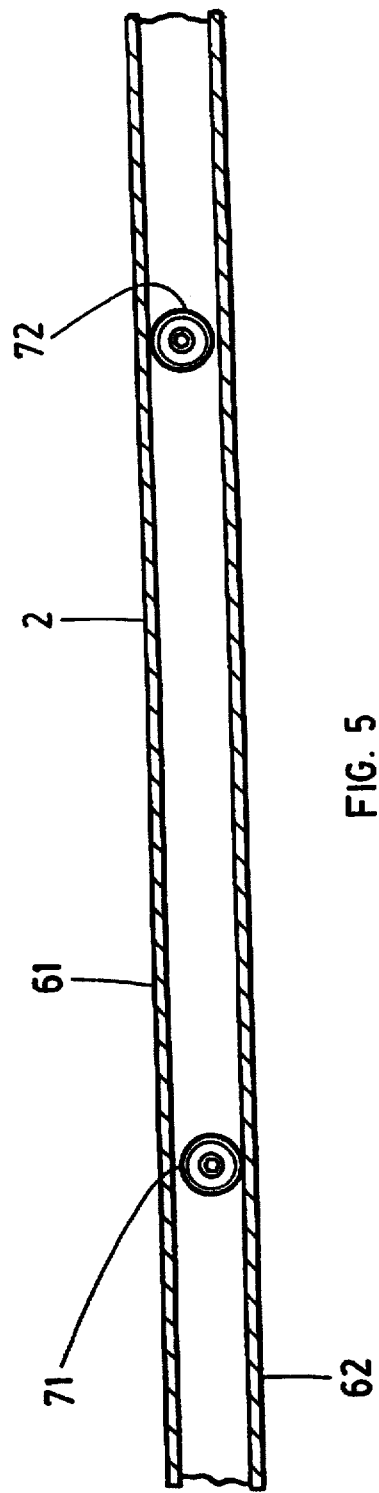
FIG. 5 is a side view of the wheels riding on the upper and lower flanges of the rail.

As illustrated in FIGS. 4 and 5, the wheels 71 and 72 can both ride on the lower flange 62, as illustrated in FIG. 4, or one (72) on the upper flange 61 and one (71) on the lower flange 62, as illustrated in FIG. 5. It would also be possible for both wheels 71 and 72 to ride on the upper flange 61, which is not illustrated.

It will be appreciated by those skilled in the art that as the carriage 10 is moving back and forth under the moving weight of a user that the carriage can be subjected to forces tending to tilt it or twist it out of its normal alignment. The provision of sliding axles within bushings (such as axle 91 within bushing 101, as illustrated in FIG. 3) permits the wheels 71 and 72 to adjust within the rail 2 to the various twisting and turning moments without seizing as they roll back and forth. Therefore, during the exercise activity the wheels 73 and 74 ride back and forth within rail 2' to maintain parallel movement of the supporting structure 50 and carriage 10 to the rail 2', while the wheels 71 and 72 adjust within the rail 2 due to the provision of sliding axles within bushings to prevent seizing of the wheels as they roll back and forth within the respective rails. Further, wheels 71, 72, 73, and 74, may ride on the upper flanges 61, 61' or the lower flanges 62, 62' within a rail 2 or 2', respectively.

The disclosure of this preferred embodiment is not intended to be limiting but rather to be explanatory of the features of this invention. The full scope of the invention may be determined by reading the whole of the specification including the claims which now follow.

The embodiments of the invention in which an exclusive property or privilege is claimed are defined as follows:

1. A reformer apparatus comprising:

a pair of parallel rails supported by a supporting structure;

a carriage mounted between and over said rails and biased towards the top end of the reformer apparatus;

cords attached to the carriage and brought through pulleys and connected to straps which are returned back towards the carriage to permit a user to pull the carriage along the rails against the biasing force;

adjustable posts to support and adjust the height of the pulleys;

a longitudinal C-shaped opening formed in the rails derived from an extrusion having upper and lower flanges and a web;

a rectangular supporting structure for the carriage including depending lugs;

wheels to run within the C-shaped openings mounted on axles set in the lugs; and bushings set within the lugs of one side of the carriage for slidably receiving the axles of one set of wheels which run along the respective C-shaped opening of one of said parallel rails so that as the carriage is pulled along the rails against the biasing force by a user the said axles of said one set of wheels are free to slide in the respective bushings to permit the wheels to adjust within the rails.

2. A reformer apparatus according to claim 1 wherein the carriage comprises a foam pad covering, shoulder supports, and a headboard to support a recumbent user.

3. A reformer according to claim 2 wherein said cords are attached to the carriage beneath the headboard.

* * * * *